US012468496B2

(12) United States Patent
Lai et al.

(10) Patent No.: US 12,468,496 B2
(45) Date of Patent: Nov. 11, 2025

(54) MEDIA DOCKING DEVICE AND MEDIA DOCKING METHOD

(71) Applicant: Realtek Semiconductor Corporation, Hsinchu (TW)

(72) Inventors: Bo Yu Lai, Hsinchu (TW); Tsung-Han Li, Hsinchu (TW); You-Wen Chiou, Hsinchu (TW); Kuan-Chi Chou, Hsinchu (TW); Chien-Wei Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/658,976

(22) Filed: May 8, 2024

(65) Prior Publication Data

US 2024/0378007 A1 Nov. 14, 2024

Related U.S. Application Data

(60) Provisional application No. 63/501,667, filed on May 11, 2023.

(30) Foreign Application Priority Data

Apr. 25, 2024 (TW) .................................. 113115568

(51) Int. Cl.
*G06F 3/14* (2006.01)
(52) U.S. Cl.
CPC .......... *G06F 3/1423* (2013.01); *G06F 3/1431* (2013.01); *G06F 3/1438* (2013.01); *G06F 3/1446* (2013.01)

(58) Field of Classification Search
CPC .... G06F 3/1423; G06F 3/1431; G06F 3/1438; G06F 3/1446; G09G 2356/00;
(Continued)

(56) References Cited

U.S. PATENT DOCUMENTS

2012/0050314 A1* 3/2012 Wang .................... G06F 3/1446
345/619
2013/0113697 A1* 5/2013 Chang ................... G06F 3/1431
345/156

(Continued)

FOREIGN PATENT DOCUMENTS

| CN | 114817099 A | 7/2022 |
|---|---|---|
| TW | I631504 B | 8/2018 |
| TW | I737313 B | 8/2021 |

*Primary Examiner* — Brent D Castiaux
(74) *Attorney, Agent, or Firm* — CKC & Partners Co., LLC

(57) ABSTRACT

A media docking device is provided and includes an input module, an output module, and a process module. The input module is electrically connected to a media source device. The output module is electrically connected to multiple media playing devices and obtains device data from the media playing devices. The process module transmits the device data and screen numbers to the media source device through the input module. When determining to perform a display switch procedure, the process module modifies the device data and the screen numbers, and transmits the modified device data and the modified screen numbers to the media source device through the input module. The process module also transmits media data from the media source device to the corresponding media playing device.

20 Claims, 7 Drawing Sheets

(58) Field of Classification Search
CPC ......... G09G 2370/04; G09G 2370/042; G09G 2370/12; G09G 2370/22
See application file for complete search history.

(56) References Cited

U.S. PATENT DOCUMENTS

2016/0335039 A1* 11/2016 Cho ...................... G06F 3/1446
2018/0191996 A1* 7/2018 Malemezian ............ H04N 5/04

* cited by examiner

MEDIA DOCKING DEVICE AND MEDIA DOCKING METHOD

CROSS-REFERENCE TO RELATED APPLICATION

This application claims priority to U.S. Provisional Application Ser. No. 63/501,667 filed May 11, 2023, and Taiwan Application Serial Number 113115568, filed Apr. 25, 2024, the disclosures of which are incorporated herein by reference in their entireties.

BACKGROUND

Field of Invention

The present disclosure relates to a media docking device which may change a configuration of multiple media playing devices regarding an extension of display screen.

Description of Related Art

In business office situations, it has become a common practice that a laptop is connected to multiple display screens through an external docking station. A user can carry the laptop to different locations, and these locations can arrange the docking station and the display screens to allow the user to use a larger screen. When the docking station is connected to multiple display screens, these display screens can be considered as an extension of a display screen of the laptop. However, if the user wants to configure the relative relationship between these display screens and the image displayed on the laptop, the user needs to perform multiple operations. Therefore, it is an issue of concern to those skilled in the art about how to allow the user to conveniently configure the above-mentioned relative relationships.

SUMMARY

The present disclosure provides a media docking device. The media docking device includes an input module, an output module, and a process module. The input module is electrically connected to a media source device. The output module is electrically connected to plural media playing devices to obtain device data of one of the media playing devices. The process module is electrically connected to the input module and the output module. The process module is configured to set plural screen numbers of the media playing devices and transmit the device data and the screen numbers to the media source device through the input module. The process module is configured to determine whether to perform a display switch procedure. When determining to perform the display switch procedure, the process module modifies the device data and the screen numbers and transmits the modified device data and the modified screen numbers to the media source device through the input module. The input module is configured to receive media data and a playing number from the media source device. The playing number indicates one of the screen numbers. The process module is configured to transmit the media data to one of the media playing devices which is indicated by the playing number through the output module.

The present disclosure further provides a media docking method. The media docking method includes: obtaining device data of one of plural media playing devices through an input module; setting plural screen numbers of the media playing devices and transmitting the device data and the screen numbers to a media source device through the input module; determining whether to perform a display switch procedure; modifying the device data and the screen numbers when determining to perform the display switch procedure, and transmitting the modified device data and the modified screen numbers to the media source device through the input module; receiving media data and a playing number from the media source device, in which the playing number indicates one of the screen numbers; and transmitting the media data to one of the media playing devices which is indicated by the playing number through the output module.

In order to let above features and advantages of the present disclosure to be more easily understood, the following detailed description of the embodiment is provided, with reference made to the accompanying drawings as follows.

DETAILED DESCRIPTION

The using of "first", "second", etc. in the specification are not intended to mean a sequence or order, and are merely used to distinguish elements or operations described in the same technical terms.

Figure 1A:
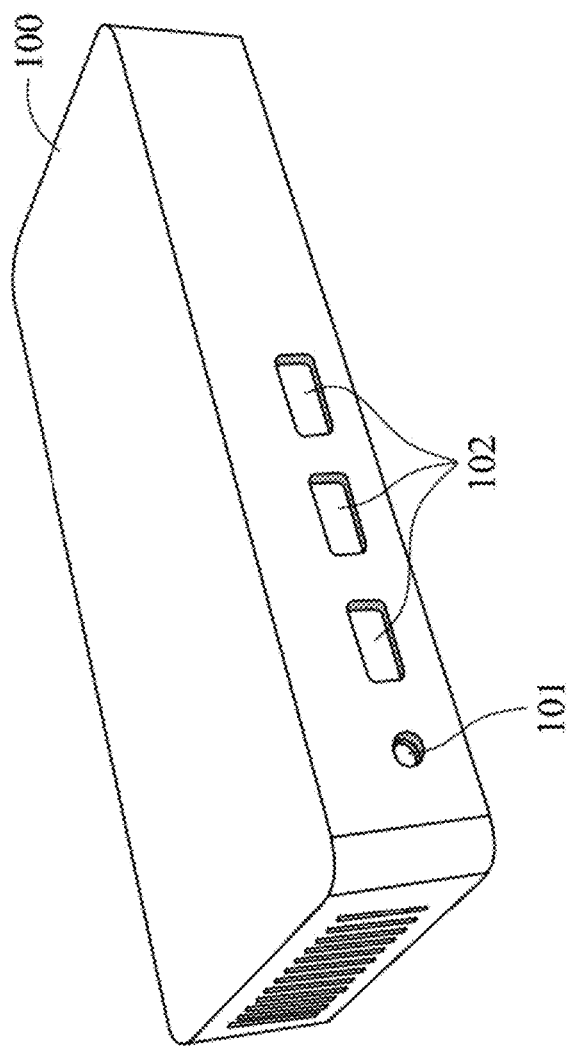
FIG. 1A and FIG. 1B are appearance diagrams of a media docking device according to one embodiment.
Figure 1B:
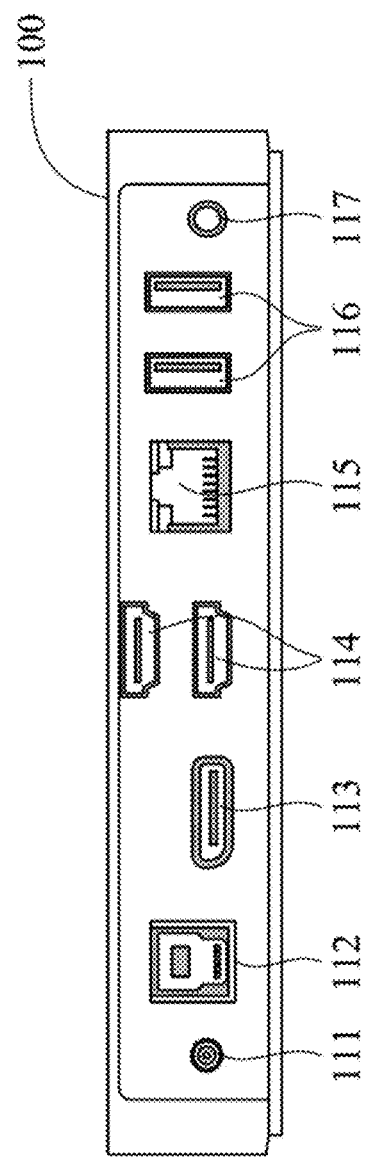

FIG. 1A and FIG. 1B are appearance diagrams of a media docking device 100 according to one embodiment. In an example of FIG. 1A and FIG. 1B, a front side of the media docking device 100 includes a combo aux port 101 and plural universal serial bus (USB) ports 102. A rear side of the media docking device 100 includes a power port 111, a USB type-B port 112, a display port (DP) 113, a high-definition multimedia interface (HDMI) 114, an Ethernet port 115, a USB type-A port 116, and an audio source output port 117. The type, the quantity, and the location of each of the above-mentioned ports on the media docking device 100 are merely present for an example, and the present disclosure is not limited thereto, and the present disclosure does not limit the size and the shape of the media docking device 100.

Figure 2:
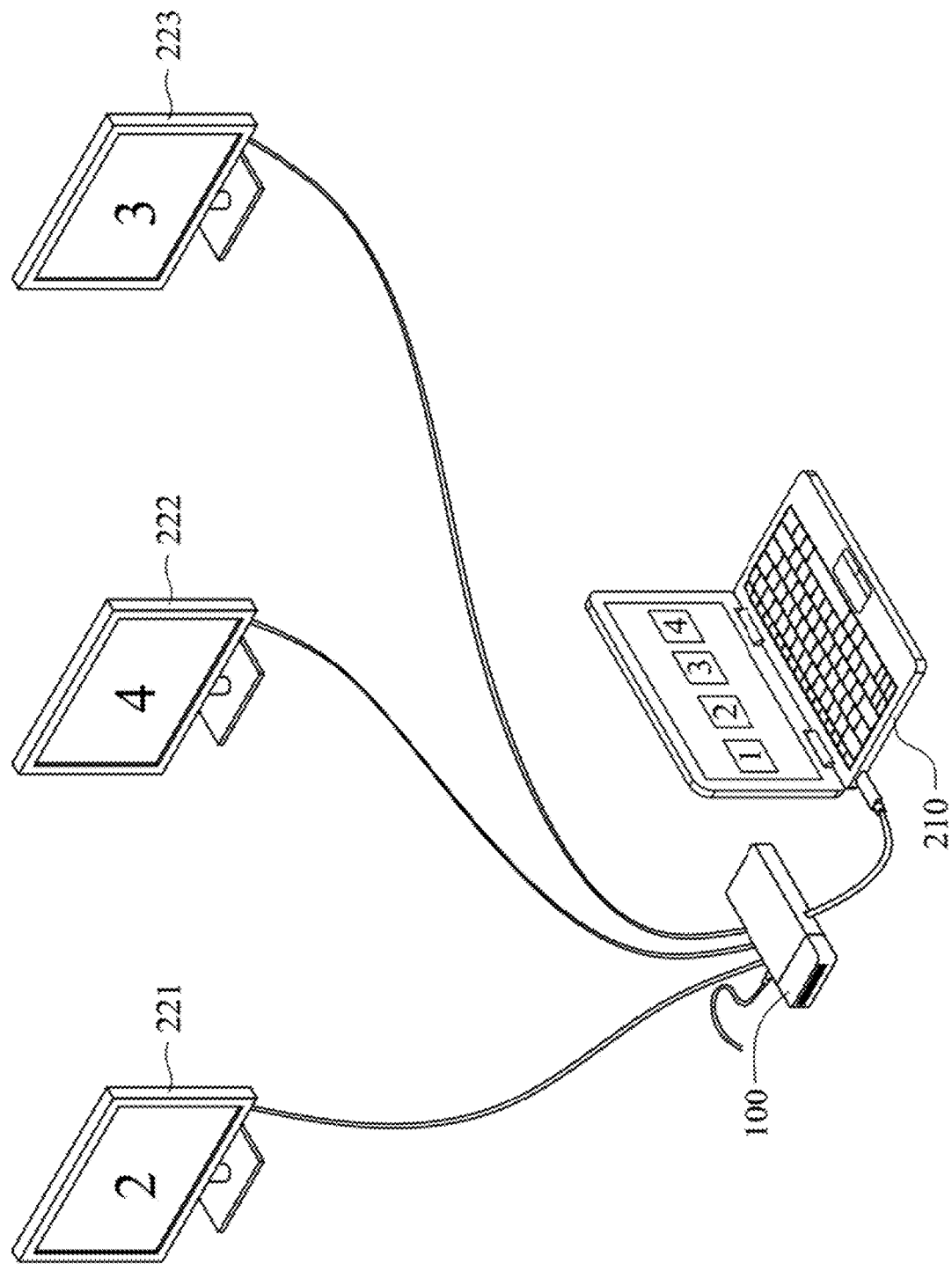
FIG. 2 is a diagram of the usage scenario of the media docking device according to one embodiment.

The usage scenario of the media docking device 100 is shown in FIG. 2. The media docking device 100 is electrically connected to the media source device 210 and media playing devices 221-223. The media source device 210 is, for example, a notebook computer in this embodiment. The media source may also be a smart phone, tablet computer, and the like in other embodiments. The media playing devices 221-223 are, for example, display screens in this embodiment. The media playing devices 221-223 may be devices with display function, such as projectors, tablet computers, and the like in other embodiments. The media playing devices 221-223 may be considered as an extension of a display screen of the media source device 210. For example, when three external display screens are detected, four graphical objects may be displayed on a setting page of the media source device 210, and the said four graphical objects are labeled as "1", "2", "3", and "4", respectively. "1" represents the display screen of the media source device 210, while "2", "3", and "4" represent the three external display screens, respectively. These four numbers are also called screen numbers, and the user may adjust the positions of these four display screens on this setting page. For the sake of explanation, the media playing devices 221-223 as show in FIG. 2 are also labeled as the screen numbers "2", "3", and "4", however, these labeled screen numbers are not the contents displayed on the display screens of the media playing devices 221-223. Specifically, these screen numbers are merely for identifying the corresponding media playing devices. In the example of FIG. 2, the user wants the media source device 210 to be the own screen on the far left, and the media playing devices 221-223 can be used as three display screens extending to the right. That is, "1", "2", "3", and "4" are arranged in an order from left to right. However, the physical placed positions of the media playing devices 221-223 may not meet the user's expectations. In this example, the screen number of the media playing device 221 is "2", the screen number of the media playing device 222 is "4", and the screen number of the media playing device 223 is "3", but what the user wants is that the screen number of the media playing device 222 is "3" and the screen number of the media playing device 223 is "4". Therefore, the user needs to perform a series of operations on this setting page to exchange the contents displayed on the media playing devices 222 and 223. In this embodiment, the present disclosure proposes a media docking method, which is performed by the media docking device 100 and can conveniently switch the contents displayed on the media playing devices 221-223. The media docking device 100 and the media docking method will be described in detail below.

Figure 3:
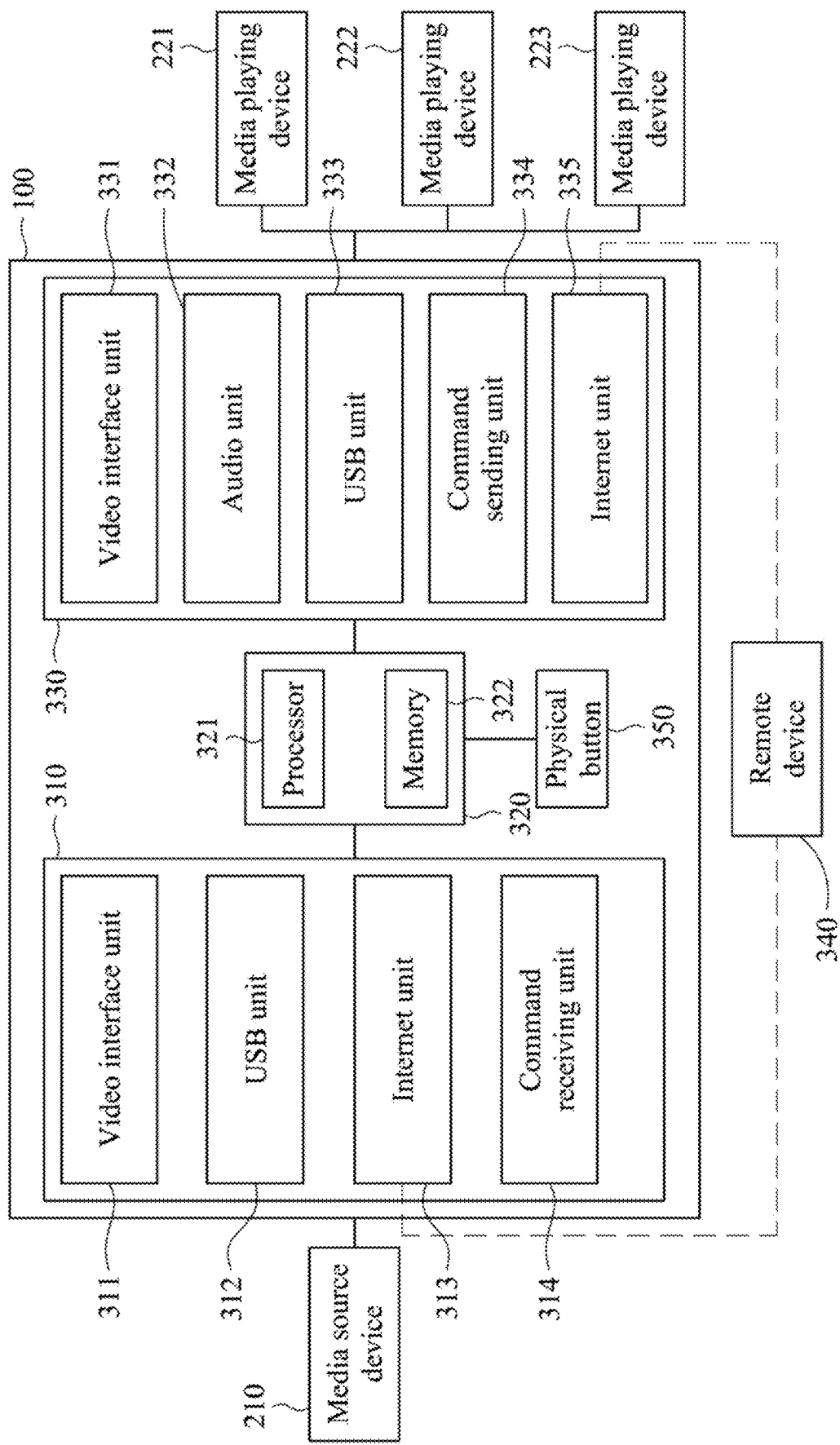
FIG. 3 is a diagram of an internal circuit of a media docking device according to one embodiment.

FIG. 3 is a diagram of an internal circuit of a media docking device according to one embodiment. Referring to FIG. 3, the media docking device 100 includes an input module 310, a process module 320, an output module 330, and a physical button 350. The process module 320 is electrically connected to the input module 310, the output module 330 and the physical button 350. The input module 310 is electrically connected to the media source device 210 and receives media data from the media source device 210. The media data is, for example, video or images, or may also include other types of data, such as audio. The output module 330 is electrically connected to the media playing devices 221-223.

The input module 310 includes a video interface unit 311, a universal serial bus (USB) unit 312, an Internet unit 313 and a command receiving unit 314. The video interface unit 311 is, for example, a circuit that complies with display port (DP) specification, HDMI specification, or digital visual interface (DVI) specification. The USB unit 312 is, for example, a circuit that complies with the universal serial bus (USB) specification. The Internet unit 313 is, for example, a circuit that complies with the Ethernet specification. The command receiving unit 314 receives the command from the media source device 210. In some embodiments, the command receiving unit 314 may also be a circuit constructed in the video interface unit 311 or the USB unit 312. For example, consumer electronics control (CEC) is defined in the HDMI specification and may be used to send the command. Therefore, the command receiving unit 314 may also be hardware or firmware that complies with the CEC specification. Alternatively, the command receiving unit 314 may also be integrated with the universal serial bus (USB). In some embodiments, the media docking device 100 is implemented on a circuit board, and the command receiving unit 314 may also be an inter-integrated circuit (I2C). In some embodiments, the command receiving unit 314 may also include (or be) a display data channel command interface (DDCCI). In some embodiments, the input module 310 may also include circuits of communication specifications such as cellular network (also called mobile network), near field communication, infrared communication, Bluetooth, and Wi-Fi. In some embodiments, the input module 310 may also include an interface or a port, such as an optical fiber interface, a musical instrument digital interface (MIDI). The aforementioned interfaces, ports and buses are only examples, and the present disclosure is not limited to the above embodiments.

The process module 320 includes a processor 321 and a memory 322. The processor 321 may be a central processing unit, a microprocessor, a microcontroller, an application specific integrated circuit (ASIC), etc. The memory 322 may be random access memory (RAM), read-only memory (ROM), flash memory, etc. In some embodiments, the memory 322 may be omitted or provided within the processor 321. The physical button 350 may be disposed on the surface of the media docking device 100 and electrically connected to the process module 320. The process module 320 may determine whether the physical button 350 is pressed according to a signal transmitted from the physical button 350.

The output module 330 includes a video interface unit 331, an audio unit 332, a USB unit 333, a command sending unit 334, and an Internet unit 335. The video interface unit 331, the USB unit 333, the command sending unit 334 and the Internet unit 335 are respectively similar to the video interface unit 311, the USB unit 312, the command receiving unit 314 and the Internet unit 313, but are used to transmit the media data. In some embodiments, the command sending unit 334 may also be integrated into the command receiving unit 314, and the Internet unit 335 may also be integrated into the Internet unit 313. The audio unit 332 is, for example, a tip-ring-sleeve (TRS) terminal or a tip-sleeve (TS) terminal, or a port that complies with the MIDI specification, and the present disclosure is not limited thereto.

In some embodiments, the Internet unit 313 and/or 335 is also connected to a remote device 340 through the Internet communication. The remote device 340 is, for example, a computer and is operated by information security personnel.

When the output module 330 is electrically connected to the media playing devices 221-223, the output module 330 will receive device data from the media playing devices 221-223. The device data is, for example, extended display identification data (EDID), which is a data structure provided by the display device. Multiple fields in the EDID may include data such as a manufacturer name, an identification code, a physical characteristic, a resolution, a supported interface, etc. The processing module 320 also sets the screen numbers of these media playing devices 221-223. In one embodiment, the screen number is a port number in the LINK ADDRESS message in the multi-stream transport (MST) technology. When the input module 310 is electrically connected to the media source device 210, the processing module 320 transmits the device data of the media playing devices 221-223 and the corresponding screen numbers to the media source device 210 through the input module 310. The media source device 210 correspondingly provides the media data corresponding to each media playing device 221-223 to the input module 310. The media source device 210 also provides the screen number corresponding to each piece of media data, and then the processing module 320 transmits each piece of media data to the corresponding media playing device 221-223 through the output module 330 according to the screen number. However, as shown in FIG. 2, the contents displayed on the media playing devices 221-223 may not be as expected by the user. For example, the processing module 320 may set the screen numbers according to the order in which the media playing devices 221-223 are connected to the output module 330. In this example, the screen number of the media playing device 221 is "2", the screen number of the media playing device 223 is "3", and the screen number of the media playing device 222 is "4". However, what the user expects is to set the screen numbers from left to right according to the physical placed positions of the media playing devices 221-223.

Figure 4:
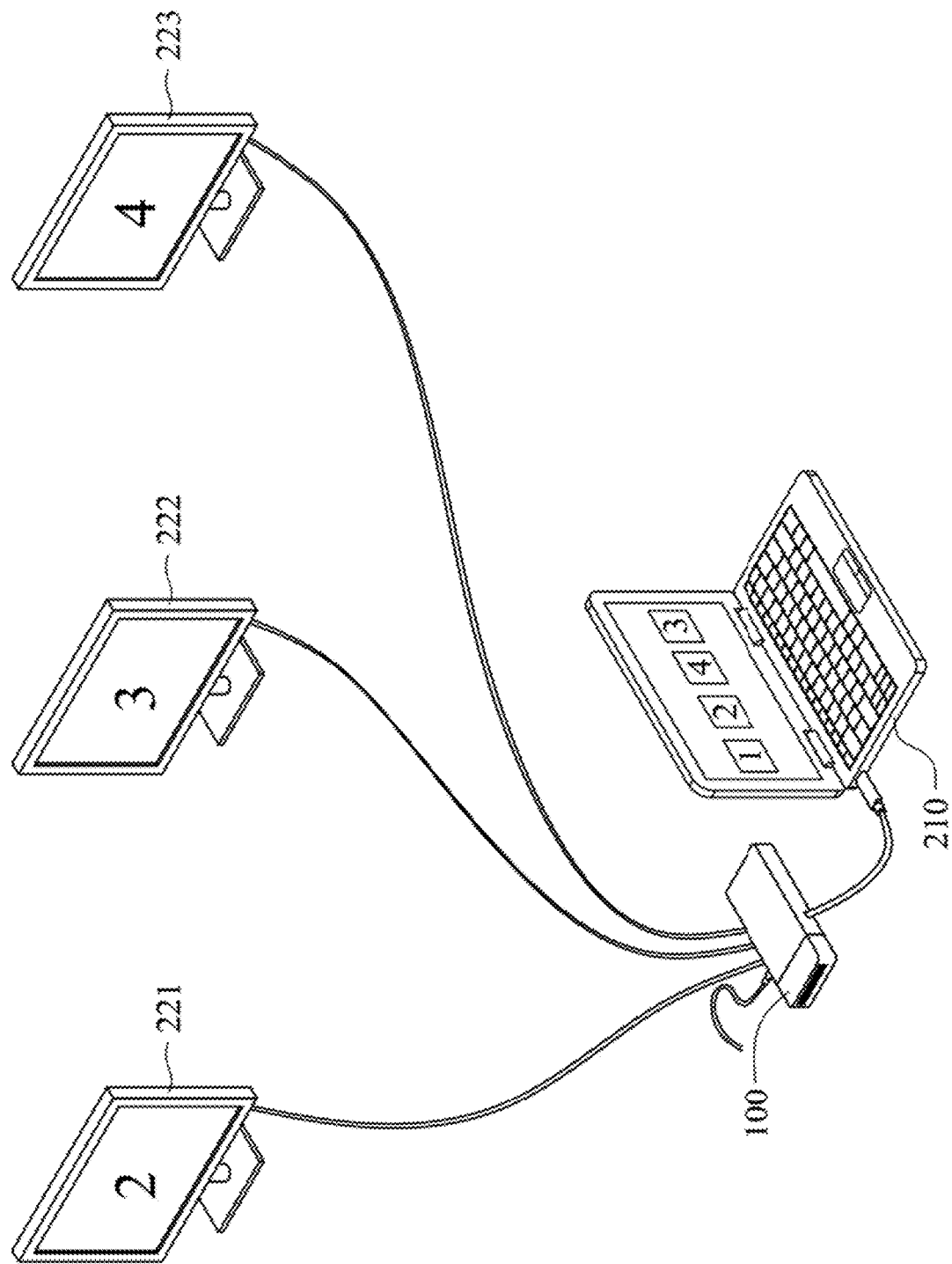
FIG. 4 is a diagram of the display state after reconnection according to a first approach.

In order to solve the above problem, the first approach is that the processing module 320 resets the screen numbers and sends new screen numbers to the media source device 210. For example, the processing module 320 may first set a signal line on the input module 310 to a preset level, thereby transmitting a signal to the media source device 210. When the media source device 210 detects this signal, it indicates that the media playing devices 221-223 are disconnected and reconnected. Next, the processing module 320 sets the screen number of the media playing device 223 to "4" and sets the screen number of the media playing device 222 to "3", and sends these settings to the media source device 210. However, some operating systems will record information of the previously connected screens and their respective screen numbers. When the media playing devices are reconnected subsequently, the media playing devices will be configured based on the previous records. At this time, only changing the screen numbers does not change the display position. For example, FIG. 4 is a diagram of the display state after reconnection according to the first approach. Referring to FIG. 4, after the above steps, the objects displayed on the display screen of the media source device 210 are the screen numbers of "1", "2", "4", and "3" in sequence, but the screen numbers of the media playing devices 221-223 are "2", "3", and "4" respectively. Therefore, the contents displayed on the media playing devices 221-223 are still not what the user expects.

A second approach is proposed here. In addition to modifying the screen numbers, the device data is further modified in order to make the media source device 210 think that the media playing devices 221-223 are new devices and therefore will not operate based on previous records. Referring to FIG. 3, when the media playing devices 221-223 are connected to the media docking device 100 for the first time, the processing module 320 performs a default procedure. The default procedure is that the device data of the media playing devices 221-223 and the default screen numbers are transmitted to the media source device 210 through the input module 310. Next, the processing module 320 determines whether to perform a display switch procedure, which may be implemented in various ways. In some embodiments, the processing module 320 determines whether the physical button 350 is pressed. When detecting that the physical button 350 is pressed, the processing module 320 determines to perform the display switch procedure. In some embodiments, the input module 310 receives a command from the remote device 340, and the processing module 320 determines whether to perform the display switch procedure according to the command. In some embodiments, the input module 310 receives a command from the media source device 210, and the processing module 320 determines whether to perform the display switch procedure according to the command.

When determining not to perform the display switch procedure, the processing module 320 will not modify the device data and screen numbers. When determining to perform the display switch procedure, the processing module 320 will modify the device data and at least one screen number of at least one of the media playing devices 221-223. For example, if the media playing devices 222 and 223 are to be changed, the device data and screen numbers of the media playing devices 222 and 223 will be modified. In some embodiments, the device data and screen numbers of all of the media playing devices 221-223 may also be modified. The modified device data may be any suitable field in the EDID, and the said suitable field may include, but is not limited to, the fields "Vendor & Product ID", "EDID Structure Version & Revision", "Basic Display Parameters and Features", "Display x, y Chromaticity Coordinates", "Established Timings I & II", "Standard Timings", and "18 Byte Descriptors". The field "18 Byte Descriptors" may include "Detailed Timing Descriptor". For example, the fields "Detailed Timing Descriptor 0", "Display Product Serial Number", "Display Product Name" or "Display Range Limits" may be modified, or the fields "Detailed Timing Descriptor 1" and "Detailed Timing Descriptor 2" may be modified. In addition, if the EDID includes the field "CTA Ext Block", such field may also be modified. The present disclosure is not limited to the fields as mentioned above.

Modifying the screen numbers may be accomplished by generating multiple arrangement combinations of the screen numbers. For example, in the embodiment of FIG. 3, there are three media playing devices 221-223, so there are six arrangement combinations, including "234", "243", "423", etc. Each time the display switch procedure is performed, one of these arrangement combinations may be selected to set the screen numbers of the media playing devices 221-223. For example, when the display switch procedure is performed for the first time, the screen number of the media playing device 221 is "2", the screen number of the media playing device 222 is "4", and the screen number of the media playing device 223 is "3". When the display switch procedure is performed for the second time, the screen number of the media playing device 221 is "3", the screen number of the media playing device 222 is "4", and the screen number of the media playing device 223 is "2", and so on.

Figure 5:
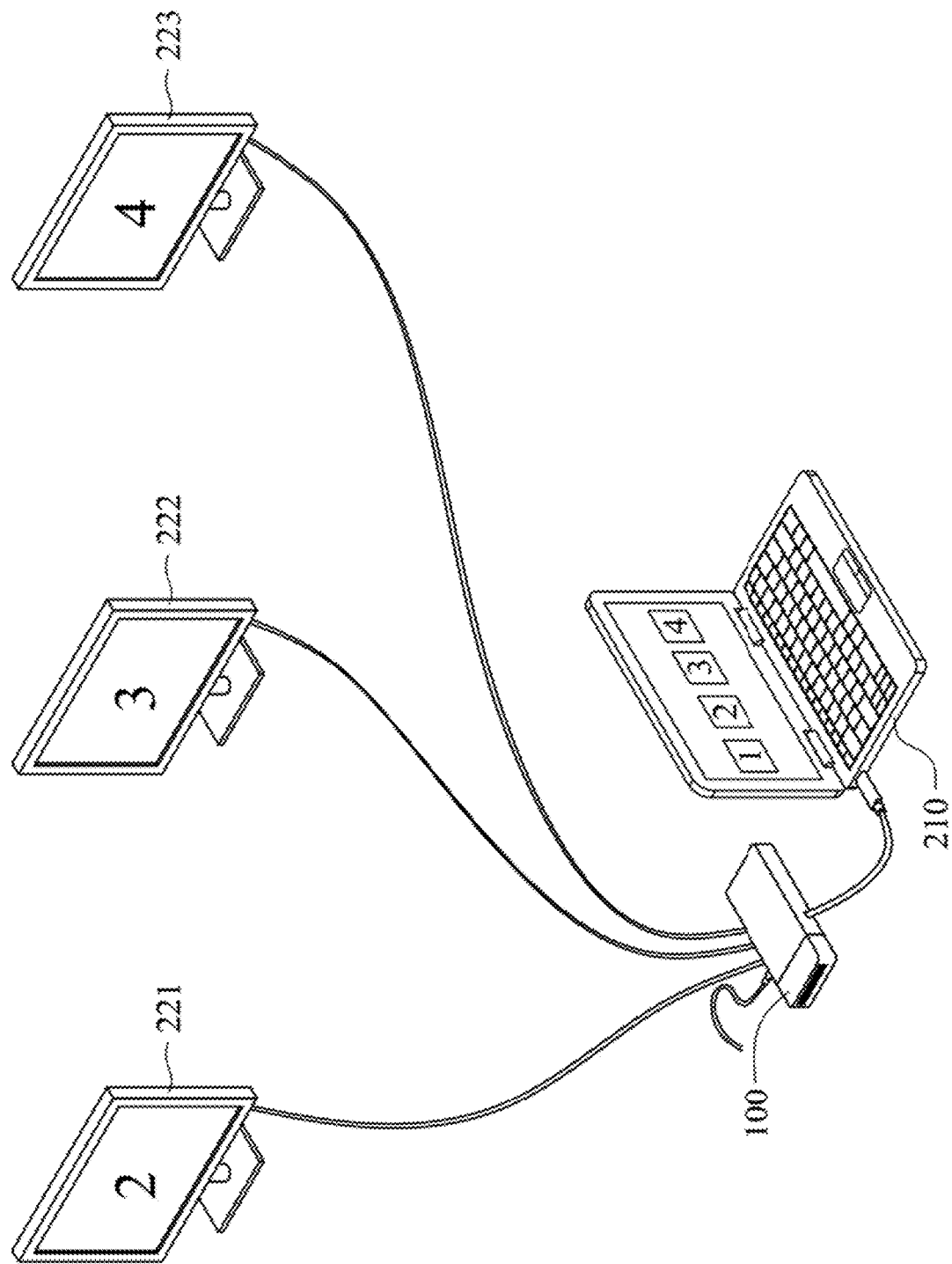
FIG. 5 is a diagram of the display state after reconnection according to a second approach.

When determining to perform the display switch procedure, the processing module 320 transmits a signal to the media source device 210 through the input module 310 to disconnect (e.g., cut off) the communication connection between the media source device 210 and at least one media playing device 221-223. The above-mentioned signal may be transmitted by changing the level of the signal line, or may also be transmitted through any communication protocol, and the present disclosure is not limited thereto. After receiving the signal, the media source device 210 receives the device data again. At this time, the processing module 320 transmits the modified device data and the modified screen numbers to the media source device 210 through the input module 310. Since the device data has been modified, the media source device 210 considers that the currently connected devices are new, and does not operate based on the previous records, but operates based on the modified screen numbers. Next, the media source device 210 will generate four pieces of the media data for its own display screen and the media playing devices 221-223, respectively. For each piece of the media data to be transmitted to the media playing devices 221-223, the media source device 210 also transmits a corresponding playing number to the input module 310. This playing number indicates one of the above-mentioned screen numbers. After receiving the media data and the corresponding playing number, the processing module 320 transmits the media data to the media playing device indicated by the corresponding playing number through the output module 330. For example, if the playing number of a certain piece of media data is "2", the processing module 320 transmits this media data to the media playing device 221, and so on. In the embodiment that the display switch procedure is performed by pressing the physical button 350, since each pressing of the physical button 350 will produce a different arrangement combination of the screen numbers, the user may continuously press (and release) the physical button 350 until the contents displayed on the media playing devices 221-223 are what the user expects. The result is as shown in FIG. 5. The screen numbers displayed on the display screen of the media source device 210 are "1", "2", "3", and "4" in order. The screen numbers of the media playing devices 221-223 are "2", "3", and "4" respectively, which is what the user expects.

In some embodiments, due to different mechanisms of the bandwidth configured by the operating system, after changing the screen numbers, the bandwidth configured by the operating system for each display screen may be changed, resulting in a change in the resolution displayed on each display screen. For example, if the media playing devices 221-223 have two display screens with a resolution of 4K and one display screen with a resolution of full high definition (FHD), the bandwidth configured by the operating system will also change after changing the screen numbers, which will cause a display screen that can originally display 4K resolution to only display FHD resolution. This change in resolution will cause viewing discomfort. In order to solve this problem, the processing module 320 can set the resolutions of the media playing devices 221-223 to be the same as each other.

Specifically, it is assumed that the media playing devices 221-223 are three display screens, in which the resolution of the media playing device 221 is 4K, the resolution of the media playing device 222 is 4K, and the resolution of the media playing device 223 is FHD. Before performing the display switch procedure, the processing module 320 modifies the device data of the media playing devices 221 and 222, so that the modified device data indicates that the resolutions of the media playing devices 221 and 222 are both FHD. That is, the resolution of each of the media playing devices 221 and 222 is the same as the resolution of the media playing devices 223. In some embodiments, the processing module 320 may modify a main frequency field "Detailed Timing Descriptor" of the EDID (i.e., the device data). This field is used to set the default resolution of the display screen. By changing this field, the resolutions of the media playing devices 221-223 are the same as each other. When performing the display switch procedure (i.e., after determining that the display switch procedure is performed), the processing module 320 will not change the main frequency field of the media playing devices 221-223 (i.e., maintaining the resolution unchanged through the device data), that is, the resolutions of the media playing devices 221-223 will not be changed. After performing the display switch procedure, the resolution of the media playing devices 221-223 will still be FHD. Because the resolutions of the media playing devices 221-223 are the same as each other and remain unchanged, the bandwidth configured by the operating system will not cause changes in the resolution.

Figure 6:
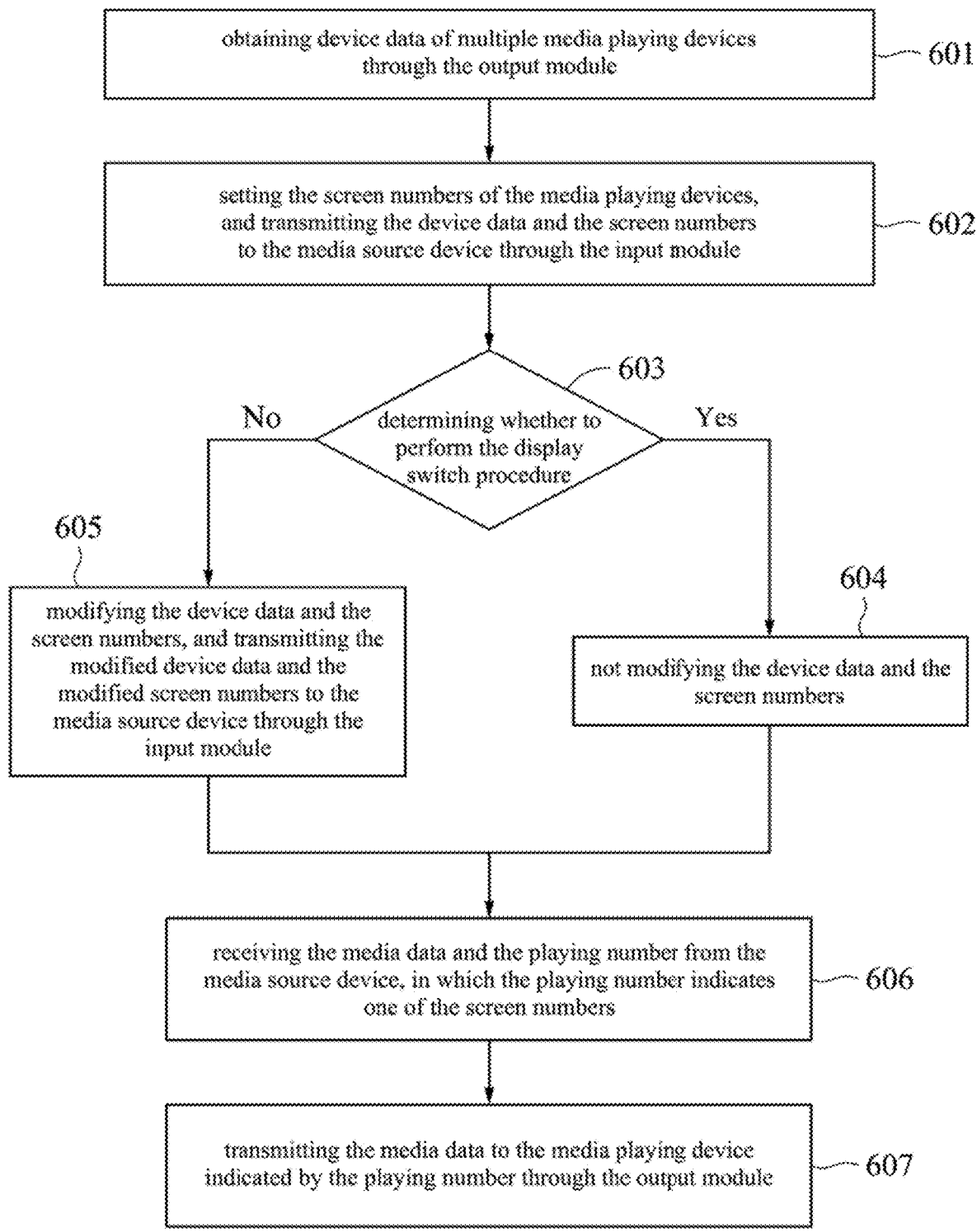
FIG. 6 is a flowchart of the media docking method according to one embodiment.

FIG. 6 is a flowchart of the media docking method according to one embodiment. Referring to FIG. 6, this media docking method is performed by the processing module 320. In step 601, device data of multiple media playing devices are obtained through the output module. In step 602, the screen numbers of the media playing devices are set, and the device data and the screen numbers are transmitted to the media source device through the input module. In step 603, it is determined whether to perform the display switch procedure. If the determining result of step 603 is yes, in step 604, the device data and the screen numbers are modified, and the modified device data and the modified screen numbers are transmitted to the media source device through the input module. If the determining result of step 603 is no, in step 605, the device data and the screen numbers are not modified. In step 606, the media data and the playing number are received from the media source device, and the playing number indicates one of the screen numbers. In step 607, the media data is transmitted to the media playing device indicated by the playing number through the output module. Each step in FIG. 6 has been described in detail above and will not be repeated here. It is worth mentioning that each step in FIG. 6 may be implemented as multiple program codes or circuits, and the present disclosure is not limited thereto. In addition, the media docking method in FIG. 6 may be used in conjunction with the above embodiments or may be used alone. In other words, other steps may also be added between the steps in FIG. 6.

In the aforementioned media docking device and media docking method, the user can change the extension relationship between the media playing devices 221-223 and the media source device 210 in a simple manner.

Although the present disclosure has been described with reference to the exemplary embodiments, the exemplary embodiments should not be regarded as a limitation. Those skilled in the art can make various changes and modifications without departing from the spirit and scope of the present disclosure. Therefore, the scope of the present disclosure should refer to the following claims.

What is claimed is:

1. A media docking device, comprising:
   an input module electrically connected to a media source device;
   an output module electrically connected to a plurality of media playing devices to obtain device data of one of the media playing devices; and
   a process module electrically connected to the input module and the output module, wherein the process module is configured to set a plurality of screen numbers of the media playing devices and transmit the device data and the screen numbers to the media source device through the input module;
   wherein the process module is configured to determine whether to perform a display switch procedure;
   wherein when determining to perform the display switch procedure, the process module modifies the device data and the screen numbers and transmits the modified device data and the modified screen numbers to the media source device through the input module;
   wherein the input module is configured to receive media data and a playing number from the media source device, wherein the playing number indicates one of the screen numbers, and the process module is configured to transmit the media data to one of the media playing devices which is indicated by the playing number through the output module; and wherein the screen numbers are utilized for identifying an order of the media playing devices, wherein the media playing devices are considered as an extension of a display screen of the media source device, wherein the display switch procedure is performed to change an extension relationship between the media playing devices and the media source device, wherein the display switch procedure is continuously performed until contents displayed on the media playing devices are what an user expects.

2. The media docking device of claim 1, wherein the device data is one of multiple fields in extended display identification data (EDID).

3. The media docking device of claim 1, wherein when determining to perform the display switch procedure, the input module is configured to transmit a signal to the media source device to disconnect a communication connection between the media source device and one of the media playing devices.

4. The media docking device of claim 1, wherein the process module is configured to generate a plurality of arrangement combinations of the screen numbers, and each time the display switch procedure is performed, the process module selects one of the arrangement combinations.

5. The media docking device of claim 1, further comprising:
a physical button electrically connected to the process module; and
wherein when detecting that the physical button is pressed, the process module determines to perform the display switch procedure.

6. The media docking device of claim 1, wherein the input module is further communicatively connected to a remote device and receives a command from the remote device; and
wherein the process module is configured to determine whether to perform the display switch procedure according to the command.

7. The media docking device of claim 1, wherein the input module is configured to receive a command from the media source device; and
wherein the process module is configured to determine whether to perform the display switch procedure according to the command.

8. The media docking device of claim 1, wherein the media playing devices are a plurality of display screens, wherein a resolution of a first display screen of the display screens is different from a resolution of a second display screen of the display screens; and
wherein before performing the display switch procedure, the process module is configured to set the device data of the first display screen and the second display screen, such that the resolution of the first display screen is the same as the resolution of the second display screen.

9. The media docking device of claim 8, wherein the device data of the first display screen or the second display screen is EDID, wherein the process module is configured to modify a main frequency field in the EDID, such that the resolution of the first display screen is the same as the resolution of the second display screen.

10. The media docking device of claim 9, wherein after determining to perform the display switch procedure, the process module sets the device data of each of the first display screen and the second display screen, such that the resolution of the first display screen and the resolution of the second display screen are unchanged.

11. A media docking method, comprising:
obtaining device data of one of a plurality of media playing devices through an input module;
setting a plurality of screen numbers of the media playing devices and transmitting the device data and the screen numbers to a media source device through the input module;
determining whether to perform a display switch procedure;
modifying the device data and the screen numbers when determining to perform the display switch procedure, and transmitting the modified device data and the modified screen numbers to the media source device through the input module;
receiving media data and a playing number from the media source device, wherein the playing number indicates one of the screen numbers;
transmitting the media data to one of the media playing devices which is indicated by the playing number through an output module; and
wherein the screen numbers are utilized for identifying an order of the media playing devices, wherein the media playing devices are considered as an extension of a display screen of the media source device, wherein the display switch procedure is performed to change an extension relationship between the media playing devices and the media source device, wherein the display switch procedure is continuously performed until contents displayed on the media playing devices are what an user expects.

12. The media docking method of claim 11, wherein the device data is one of multiple fields in EDID.

13. The media docking method of claim 11, further comprising:
transmitting a signal to the media source device to disconnect a communication connection between the media source device and one of the media playing devices when determining to perform the display switch procedure.

14. The media docking method of claim 11, further comprising:
generating a plurality of arrangement combinations of the screen numbers; and
selecting one of the arrangement combinations each time the display switch procedure is performed.

15. The media docking method of claim 11, wherein steps for determining whether to perform a display switch procedure comprise:
determining to perform the display switch procedure, when detecting that a physical button is pressed.

16. The media docking method of claim 11, wherein steps for determining whether to perform a display switch procedure comprise:
receiving a command from a remote device and determining whether to perform the display switch procedure according to the command.

17. The media docking method of claim 11, wherein steps for determining whether to perform a display switch procedure comprise:
receiving a command from the media source device and determining whether to perform the display switch procedure according to the command.

18. The media docking method of claim 11, wherein the media playing devices are a plurality of display screens, wherein a resolution of a first display screen of the display screens is different from a resolution of a second display screen of the display screens, wherein the media docking method further comprises:

setting the device data of the first display screen and the second display screen before performing the display switch procedure, such that the resolution of the first display screen is the same as the resolution of the second display screen.

19. The media docking method of claim 18, wherein the device data of the first display screen or the second display screen is EDID, wherein the media docking method further comprises:

modifying a main frequency field in the EDID, such that the resolution of the first display screen is the same as the resolution of the second display screen.

20. The media docking method of claim 19, further comprising:

setting the device data of each of the first display screen and the second display screen after determining to perform the display switch procedure, such that the resolution of the first display screen and the resolution of the second display screen are unchanged.

\* \* \* \* \*